United States Patent
Yen

(10) Patent No.: US 11,942,814 B2
(45) Date of Patent: Mar. 26, 2024

(54) SMART BATTERY DEVICE AND OPERATION METHOD THEREOF

(71) Applicant: Quanta Computer Inc., Taoyuan (TW)

(72) Inventor: Wei-Ting Yen, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 192 days.

(21) Appl. No.: 17/234,267

(22) Filed: Apr. 19, 2021

(65) Prior Publication Data
US 2022/0285966 A1  Sep. 8, 2022

(30) Foreign Application Priority Data

Mar. 3, 2021  (TW) ................................ 110107423

(51) Int. Cl.
*H01M 10/42* (2006.01)
*H01M 10/44* (2006.01)
(Continued)

(52) U.S. Cl.
CPC ... *H02J 7/007194* (2020.01); *H01M 10/4257* (2013.01); *H01M 10/443* (2013.01);
(Continued)

(58) Field of Classification Search
CPC ............. H02J 7/007194; H02J 7/00714; H02J 7/0049; H01M 10/4257; H01M 10/443;
(Continued)

(56) References Cited

U.S. PATENT DOCUMENTS

2011/0127968 A1*  6/2011  Chan .................. H02J 7/007194
                                                         320/136
2014/0375231 A1* 12/2014  Suzuki ................. G01R 31/382
                                                         324/426
(Continued)

FOREIGN PATENT DOCUMENTS

EP     1 328 055 B1     7/2012
EP     2 983 062 A1     2/2016
(Continued)

OTHER PUBLICATIONS

Extended European Search Report dated Oct. 27, 2021, issued in application No. EP 21172193.1.
Chinese language office action dated Sep. 29, 2021, issued in application No. TW 110107423.

*Primary Examiner* — Drew A Dunn
*Assistant Examiner* — Pamela J Jeppson
(74) *Attorney, Agent, or Firm* — McClure, Qualey & Rodack, LLP

(57) ABSTRACT

A smart battery device includes a battery unit, a temperature-sensing unit and a processing unit. The temperature-sensing unit senses the ambient temperature to generate a temperature signal. The processing unit is coupled to the battery unit and the temperature-sensing unit. In a charging mode, the processing unit receives the temperature signal and obtains the power capacity of the battery unit. The processing unit sets full capacity according to the temperature signal and generates an indication flag when the power capacity of the battery unit reaches the full capacity, wherein the indication flag is used to indicate that the battery unit is in a fully charged state.

8 Claims, 6 Drawing Sheets

(51) Int. Cl.
  *H01M 10/46* (2006.01)
  *H01M 10/48* (2006.01)
  *H02J 7/00* (2006.01)

(52) U.S. Cl.
  CPC ......... *H01M 10/46* (2013.01); *H01M 10/486* (2013.01); *H02J 7/0049* (2020.01); *H02J 7/00714* (2020.01); *H01M 2010/4271* (2013.01)

(58) Field of Classification Search
  CPC ............... H01M 10/46; H01M 10/486; H01M 2010/4271
  See application file for complete search history.

(56) References Cited

U.S. PATENT DOCUMENTS

| | | | |
|---|---|---|---|
| 2016/0079777 A1* | 3/2016 | Bhardwaj | H02J 7/00 320/153 |
| 2017/0207651 A1* | 7/2017 | Geng | H01M 10/46 |
| 2017/0264123 A1 | 9/2017 | Mulawski | |
| 2020/0223318 A1 | 7/2020 | Campbell et al. | |
| 2020/0403416 A1 | 12/2020 | Yen | |

FOREIGN PATENT DOCUMENTS

| | | |
|---|---|---|
| JP | 10174297 A | 6/1998 |
| JP | 2003-209933 A | 7/2003 |

\* cited by examiner

SMART BATTERY DEVICE AND OPERATION METHOD THEREOF

CROSS REFERENCE TO RELATED APPLICATIONS

This application claims priority of Taiwan Patent Application No. 110107423, filed on Mar. 3, 2021, the entirety of which is incorporated by reference herein.

TECHNICAL FIELD

The present invention relates to a battery device, and in particular it relates to a smart battery device and an operation method thereof.

BACKGROUND

Battery devices can provide electrical energy. Therefore, battery devices are commonly found in various electronic devices. In recent years, lifespan, performance, and safety of battery devices are a concern, and manufacturers hope to be able to provide products that perform extremely well. However, the operating temperature and charging/discharging current of the battery devices may affect the lifespan, performance and safety of the battery devices. Therefore, how to increase and manage the lifespan, performance and safety of the battery devices has become a focus for technical improvements by various manufacturers.

SUMMARY

An embodiment of the present invention provides a smart battery device and an operation method thereof, thereby increasing lifespan, performance and safety of a battery unit.

An embodiment of the present invention provides a smart battery device, which includes a battery unit, a temperature-sensing unit and a processing unit. The temperature-sensing unit is configured to sense the ambient temperature to generate a temperature signal. The processing unit is coupled to the battery unit and the temperature-sensing unit. In a charging mode, the processing unit is configured to receive the temperature signal and obtain the power capacity of the battery unit, set a full capacity according to the temperature signal, and generate an indication flag when the power capacity of the battery unit reaches the full capacity, wherein the indication flag is used to indicate that the battery unit is in a fully charged state.

An embodiment of the present invention provides an operation method of a smart battery device, which includes the following steps. An ambient temperature is sensed to generate a temperature signal. In a charging mode, the temperature signal is received and the power capacity of a battery unit is obtained. A full capacity is set according to the temperature signal, and an indication flag is generated when the power capacity of the battery unit reaches the full capacity, wherein the indication flag is used to indicate that the battery unit is in a fully charged state.

According to the smart battery device and an operation method thereof disclosed by the present invention, the temperature-sensing unit senses the ambient temperature to generate the temperature signal. In the charging mode, the processing unit generates an indication flag according to the temperature signal and the power capacity of the battery unit, wherein the indication flag is used to indicate that the battery unit is in the fully charged state. Therefore, the smart battery device may be effectively managed, so as to increase lifespan, performance and safety of the battery unit.

BRIEF DESCRIPTION OF DRAWINGS

The present invention can be more fully understood by reading the subsequent detailed description and examples with references made to the accompanying drawings, wherein.

DETAILED DESCRIPTION OF DISCLOSED EMBODIMENTS

In each of the following embodiments, the same reference number represents an element or component that is the same or similar.

Figure 1:
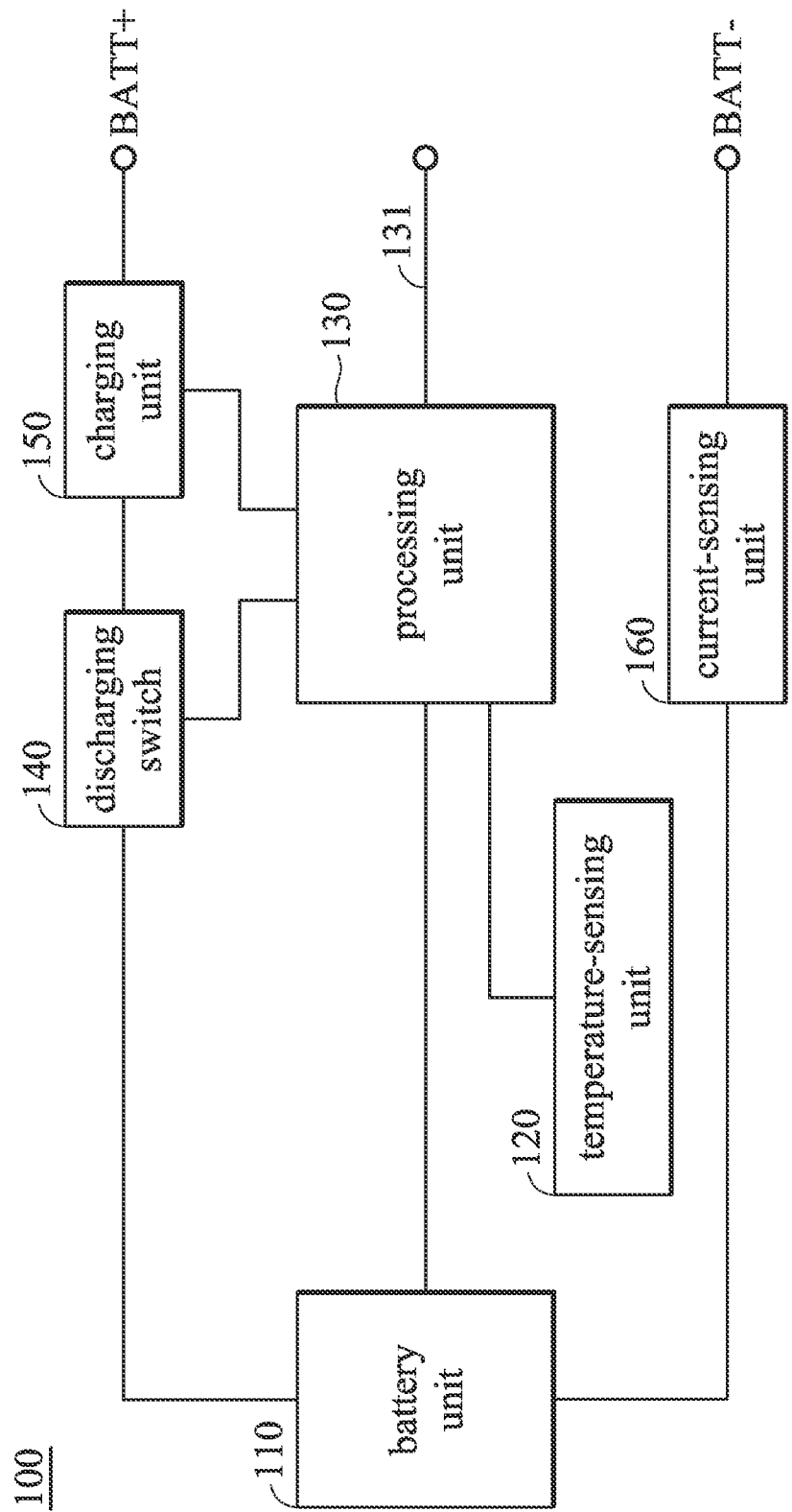
FIG. 1 is a schematic view of a smart battery device according an embodiment of the present invention.

FIG. 1 is a schematic view of a smart battery device according an embodiment of the present invention. Please refer to FIG. 1. The smart battery device 100 may be configured to store an electrical power, and provide the stored electrical power to a power receiving device (not shown) connected thereto. In some embodiments, the power receiving device may be various electronic devices or electronic vehicles that need to be actuated with the electrical power, but the embodiment of the present invention is not limited thereto.

The smart battery device 100 includes a battery unit 110, a temperature-sensing unit 120, a processing unit 130, a discharging switch 140 and a charging unit 150.

The battery unit 110 is configured to provide the electrical power. In some embodiments, the battery unit 110 may be formed by one battery cell or more battery cells connected in series and/or in parallel. In addition, the battery unit 110 may be a Lithium battery, a Nickel-Hydrogen battery, a Sealed Lead-Acid battery, or any other suitable rechargeable battery.

The temperature-sensing unit 120 senses the ambient temperature to generate a temperature signal. In some embodiments, the temperature-sensing unit 120 may be implemented by a positive temperature coefficient (PTC) thermistor, a negative temperature coefficient (NTC) thermistor, a temperature-sensing chip or nay other suitable temperature-sensing element.

The processing unit 130 is coupled to the battery unit 110 and the temperature-sensing unit 120. In some embodiments, the processing unit 130 may be implemented by a system on a chip (SoC), a central processing unit (CPU), a micro controller unit (MCU), an application specific integrated circuit (ASIC), an application processor (AP) or a digital signal processor (DSP), but the embodiment of the present invention is not limited thereto.

The discharging switch 140 is coupled to the battery unit 110 and the processing unit 130. The processing unit 130 controls the discharging switch 140, such that the smart battery device 100 may enter to a discharging mode to provide the electrical power of the battery unit 110 to the power receiving device, for example. The charging unit 150 is coupled to the processing unit 130 and a battery positive terminal BATT+ of the smart battery device 100. The processing unit 130 controls the charging unit 150, such that the smart battery device 100 may enter to a charging mode, so as to charge the battery unit 110 through a charging current provided by an external power (not shown), for example. In some embodiments, the discharging switch 140 and the charging unit 150 may be implemented by a field-effect transistor (FET), but the embodiment of the present invention is not limited thereto.

In the embodiment, the processing unit 130 may detect whether an external power exists. When the processing unit 130 detects that the external power exists, indicates that the smart battery device 100 may enter a charging mode, such that the processing unit 130 may control the charging unit 150 to charge the battery unit 110. Then, in the charging mode, the processing unit 130 receives the temperature signal and obtains the power capacity of the battery unit 110, sets a full capacity according to the temperature signal, and generates an indication flag when the power capacity of the battery unit 110 reaches full capacity, wherein the indication flag is used to indicate that the battery unit is in a fully charged state. That is, the processing unit 130 may set different full capacities of the battery unit 110 according to different temperatures. Therefore, the lifespan and safety of the battery may be effectively increased.

Furthermore, after the processing unit 130 the temperature signal, the processing unit 130 may determine whether the temperature of the temperature signal is lower than a first predetermined temperature. In the embodiment, the first predetermined temperature is, for example, 0 degree, but the embodiment of the present invention is not limited thereto.

When the temperature of the temperature signal is lower than the first predetermined temperature, it indicates that the smart battery device 100 is at a colder temperature. In order to present the battery unit 110 from being charged at this temperature and affecting lifespan or performance of the battery unit 110, the processing unit 130 may control the smart battery device 100 to enter a protection mode. For example, the processing unit 130 may control the charging unit 150 to be turned off, so as to turn off a function of charging the battery unit 110.

When the temperature of the temperature signal is not lower than the first predetermined temperature, the processing unit 130 may determine whether the temperature of the temperature signal is lower than a second determined temperature. In the embodiment, the second predetermined temperature is, for example, higher than the first predetermined temperature. In addition, the second predetermined temperature is, for example, 25 degrees, but the embodiment of the present invention is not limited thereto.

When the temperature of the temperature signal is lower than the second predetermined value, for example, the temperature is between 0 degree and 25 degrees, it indicates that the smart battery device 100 is at relatively normal temperature. Then, the processing unit 130 may set the full capacity to a first predetermined value and generate the indication flag when the power capacity of the battery unit 110 reaches the first predetermined value. In the embodiment, the first predetermined value is, for example, 100%, but the embodiment of the present invention is not limited thereto. That is, when the temperature is between 0 degree and 25 degrees and the power capacity of the battery unit 110 reaches the first predetermined value, the processing unit 130 generates, for example, an indication flag with a high logic level "1" to indicate that the battery unit 110 is in the fully charged state (such as 100%). Then, the indication flag with the high logic level "1" may be provided to the power receiving device, such that the power receiving device may display that the battery unit 110 is in the fully charged state (i.e. 100%).

When the temperature of the temperature signal is not lower than the second predetermined temperature, the processing unit 130 may determine whether the temperature of the temperature signal is lower than a third predetermined temperature. In the embodiment, the third predetermined temperature is, for example, higher than the second predetermined temperature. In addition, the third predetermined temperature is, for example, 45 degrees, but the embodiment of the present invention is not limited thereto.

When the temperature of the temperature signal is lower than the third predetermined value, for example, the temperature is between 25 degrees and 45 degrees, it indicates that the smart battery device 100 is at a relatively high temperature. Then, the processing unit 130 may set the full capacity to a second predetermined value and generate the indication flag when the power capacity of the battery unit 110 reaches the second predetermined value. In the embodiment, the second predetermined value is, for example, lower than the first predetermined value. In addition, the second predetermined value is, for example, 95%, but the embodiment of the present invention is not limited thereto. That is, when the temperature is between 25 degrees and 45 degrees and the power capacity of the battery unit 110 reaches the second predetermined value (such as 95%), the processing unit 130 generates, for example, the indication flag with the high logic level "1" to indicate that the battery unit 110 is in the fully charged state (such as 100%). Then, the indication flag with the high logic level "1" may be provided to the power receiving device, such that the power receiving device may display that the battery unit 110 is in the fully charged state (i.e. 100%).

When the temperature of the temperature signal is not lower than the third predetermined temperature, the processing unit 130 may determine whether the temperature of the temperature signal is lower than a fourth predetermined temperature. In the embodiment, the fourth predetermined temperature is, for example, higher than the third predetermined temperature. In addition, the fourth predetermined temperature is, for example, 60 degrees, but the embodiment of the present invention is not limited thereto.

When the temperature of the temperature signal is lower than the fourth predetermined value, for example, the temperature is between 45 degrees and 60 degrees, it indicates that the smart battery device 100 is at a higher temperature. Then, the processing unit 130 may set the full capacity to a third predetermined value and generate the indication flag when the power capacity of the battery unit 110 reaches the third predetermined value. In the embodiment, the third predetermined value is, for example, lower than the second predetermined value. In addition, the third predetermined value is, for example, 90%, but the embodiment of the present invention is not limited thereto. That is, when the temperature is between 45 degrees and 60 degrees and the power capacity of the battery unit 110 reaches the third predetermined value (such as 90%), the processing unit 130 generates, for example, the indication flag with the high logic level 1 to indicate that the battery unit 110 is in the fully charged state (such as 100%). Then, the indication flag with the high logic level "1" may be provided to the power receiving device, such that the power receiving device may display that the battery unit 110 is in the fully charged state (i.e. 100%).

When the temperature of the temperature signal is not lower than the fourth predetermined temperature, for example, the temperature is higher than 60 degrees, it indicates that the smart battery device 100 is at an excessively high temperature. In order to present the battery unit 110 from being charged at this temperature and affecting span or performance of the battery unit 110, the processing unit 130 may control the smart battery device 100 to enter the protection mode. For example, the processing unit 130 may control the charging unit 150 to be turned off, so as to turn off the function of charging the battery unit 110.

In the above embodiment, after the processing unit 130 generates, for example, the indication flag with the high logic level "1", when the processing unit 130 detects that the power capacity of the battery 110 is not in the fully charged state (e.g. 100%, 95%, or 90%) corresponding to the indication flag, the processing unit 130 may clear the indication flag, and provide the current power capacity of the battery unit 110 to the power receiving device, such that the power receiving device displays the current power capacity of the battery unit 110.

In addition, the smart battery device 100 of the embodiment further includes a current-sensing unit 160. The current-sensing unit 160 is coupled to the battery unit 110, the processing unit 130 and a battery negative terminal BATT− of the smart battery device 100. The current-sensing unit 160 may sense the discharging current of the battery unit 110.

When the processing unit 130 detects that the external power does not exist, it indicates that the smart battery device 100 may enter a discharging mode, such that the processing unit 130 may control the discharging switch 140 to discharge the battery unit 110. Then, in the discharging mode, the processing unit 130 may receive the temperature signal and the discharging current, and generate an adjustment indication according to the temperature signal or the C-rate of the discharging current, wherein the adjustment indication is used to indicate the power receiving device to adjust an operation. Afterward, the processing unit 130 may transmit the adjustment indication to the power receiving device through a transmission interface 131. In some embodiments, transmission interface 131 is, for example, a system management bus (SMbus). That is, the processing unit 130 may provide different adjustment indications to the power receiving device according to the different temperatures or the different C-rates of the discharging current, such that the power receiving device adjusts the power consumption of the internal components thereof (for example, adjusting the frequency of a processing device (such as CPU) of the power receiving device). Therefore, lifespan and safety of the battery may be effectively increased.

Furthermore, after the processing unit 130 receives the temperature signal, the processing unit 130 may determine whether the temperature of the temperature signal is lower than the first predetermined temperature. In the embodiment, the first predetermined temperature is for example, −20 degrees, but the embodiment of the present invention is not limited thereto.

When the temperature of the temperature signal is lower than the first predetermined temperature, it indicates that the smart battery device 100 is at a too cold temperature. In order to present the battery unit 110 from being discharged at this temperature and affecting lifespan or performance of the battery unit 110, the processing unit 130 may control the smart battery device 100 to enter a protection mode. For example, the processing unit 130 may control the discharging switch 140 to be turned off, so as to turn off a function of discharging the battery unit 110.

When the temperature of the temperature signal is not lower than the first predetermined temperature, the processing unit 130 may determine whether the temperature of the temperature signal is lower than a second determined temperature. In the embodiment, the second predetermined temperature is, for example, higher than the first predetermined temperature. In addition, the second predetermined temperature is, for example, 45 degrees, but the embodiment of the present invention is not limited thereto.

When the temperature of the temperature signal is lower than the second predetermined value, for example, the temperature is between −20 degrees and 45 degrees, it indicates that the smart battery device 100 is at relatively normal temperature, and the processing unit 130 does not generate the adjustment indication. That is, the processing unit 130 does not generate the adjustment indication to the power receiving device, and the power receiving device does also not adjust the operation and performs the normal operation. Then, the processing unit 130 may continuously monitor the temperature signal to perform the subsequent operation, such as the operation of controlling the smart battery device 100 to enter the protection mode or not generating an adjustment indication.

When the temperature of the temperature signal is not lower than the second predetermined temperature, the processing unit 130 may determine whether the temperature of the temperature signal is lower than a third predetermined temperature. In the embodiment, the third predetermined temperature is, for example, higher than the second predetermined temperature. In addition, the third predetermined temperature is, for example, 50 degrees, but the embodiment of the present invention is not limited thereto.

When the temperature of the temperature signal is lower than the third predetermined value, for example, the temperature is between 45 degrees and 50 degrees, it indicates that the smart battery device 100 is at a slightly higher temperature. Then, the processing unit 130 generates an adjustment indication with a first adjustment value. In the embodiment, the first adjustment value is, for example, a throttling of 25%, but the embodiment of the present invention is not limited thereto. That is, when the temperature is between 45 degrees and 50 degrees, the processing unit 130 generates, for example, the adjustment indication with the throttling of 25% to the power receiving device, such that the power receiving device may perform the throttling of 25% for the frequency of the processing device of the power receiving device according to the adjustment indication with the throttling of 25%. Then, the processing unit 130 may continuously monitor the temperature signal to perform the subsequent operation, such as the operation of not generating an adjustment indication or generating an adjustment indication with the first adjustment value.

When the temperature of the temperature signal is not lower than the third predetermined temperature, the processing unit 130 may determine whether the temperature of the temperature signal is lower than a fourth predetermined temperature. In the embodiment, the fourth predetermined temperature is, for example, higher than the third predetermined temperature. In addition, the fourth predetermined temperature is, for example, 55 degrees, but the embodiment of the present invention is not limited thereto.

When the temperature of the temperature signal is lower than the fourth predetermined value, for example, the temperature is between 50 degrees and 55 degrees, it indicates that the smart battery device 100 is at a relatively high temperature. Then, the processing unit 130 generates an adjustment indication with a second adjustment value. In the embodiment, the second adjustment value is, for example, a throttling of 50%, but the embodiment of the present invention is not limited thereto. That is, when the temperature is between 50 degrees and 55 degrees, the processing unit 130 generates, for example, the adjustment indication with the throttling of 50% to the power receiving device, such that the power receiving device may perform the throttling of 50% for the frequency of the processing device of the power receiving device according to the adjustment indication with the throttling of 50%. Then, the processing unit 130 may continuously monitor the temperature signal to perform the operation of generating an adjustment indication with the first adjustment value or generating an adjustment indication with the second adjustment value.

When the temperature of the temperature signal is not lower than the fourth predetermined temperature, the processing unit 130 may determine whether the temperature of the temperature signal is lower than a fifth predetermined temperature. In the embodiment, the fifth predetermined temperature is, for example, higher than the fourth predetermined temperature. In addition, the fifth predetermined temperature is, for example, 60 degrees, but the embodiment of the present invention is not limited thereto.

When the temperature of the temperature signal is lower than the fifth predetermined value, for example, the temperature is between 55 degrees and 60 degrees, it indicates that the smart battery device 100 is at a higher temperature. Then, the processing unit 130 generates an adjustment indication with a third adjustment value. In the embodiment, the third adjustment value, for example, a throttling of 75%, but the embodiment of the present invention is not limited thereto. That is, when the temperature is between 55 degrees and 60 degrees, the processing unit 130 generates, for example, the adjustment indication with the throttling of 75% to the power receiving device, such that the power receiving device may perform the throttling of 75% for the frequency of the processing device of the power receiving device according to the adjustment indication with the throttling of 75%. Then, the processing unit 130 may continuously monitor the temperature signal to perform the operation of generating an adjustment indication with the second adjustment value or generating an adjustment indication with the third adjustment value.

When the temperature of the temperature signal is not lower than the fifth predetermined temperature, for example, the temperature is higher than 60 degrees, it indicates that the smart battery device 100 is at an excessively high temperature. Then, the processing unit 130 generates an adjustment indication with a shutdown indication. That is, when the temperature is higher than 60, the processing unit 130 generates an adjustment indication with the shutdown indication to the power receiving device, such that the power receiving device performs the shutdown operation, so as to prevent the battery unit 110 from being discharged at this temperature and affecting lifespan or performance of the battery unit 110. Therefore, the processing unit 130 generates an adjustment indication, such that the processing device of the power receiving device performs the throttling operation or the power receiving device perform the shutdown operation to avoid the over-discharge of the battery unit 110, thereby effectively increasing lifespan, performance and safety of the battery unit 110.

In addition, after the processing unit 130 receives the discharging current, the processing unit 130 may determine whether the C-rate of the discharging current is lower than a first predetermined C-rate. In the embodiment, the first predetermined C-rate is, for example, 1C, but the embodiment of the present invention is not limited thereto.

When the C-rate of the discharging current is lower than the first predetermined C-rate, it indicates that the C-rate of the discharging current is normal, and the processing unit 130 does not generate the adjustment indication. That is, the processing unit 130 does not generate the adjustment indication to the power receiving device, and the power receiving device does also not adjust the operation and performs the normal operation. Then, the processing unit 130 may continuously monitor the discharging current to perform the subsequent operation, for example, the processing unit 130 does not generate the adjustment indication.

When the C-rate of the discharging current is not lower than the first predetermined C-rate, the processing unit 130 may determine whether the C-rate of the discharging current is lower than a second predetermined C-rate. In the embodiment, the second predetermined C-rate is, for example, higher than the first predetermined C-rate. In addition, the second predetermined C-rate is, for example, 1.2C, but the embodiment is not limited thereto.

When the C-rate of the discharging current is lower than the second predetermined C-rate, for example, the C-rate of the discharging current is between 1C and 1.2C, it indicates that the C-rate of the discharging current is slightly higher. Then, the processing unit 130 generates an adjustment indication with a first adjustment value. In the embodiment, the first adjustment value is for example, a throttling of 50%, but the embodiment of the present invention is not limited thereto. That is, when the C-rate of the discharging current is between 1C and 1.2C, the processing unit 130 generates, for example, the adjustment indication with the throttling of 50% to the power receiving device, such that the power receiving device may perform the throttling of 50% for the frequency of the processing device of the power receiving device according to the adjustment indication with the throttling of 50%. Then, the processing unit 130 may continuously monitor the discharging current to perform the subsequent operation, such as the operation of not generating an adjustment indication or generating an adjustment indication with the first adjustment value.

When the C-rate of the discharging current is not lower than the second predetermined C-rate, the processing unit 130 may determine whether the C-rate of the discharging current is lower than a third predetermined C-rate. In the embodiment, the third predetermined C-rate is, for example, higher than the second predetermined C-rate. In addition, the third predetermined C-rate is, for example, 1.4C, but the embodiment of the present invention is not limited thereto.

When the C-rate of the discharging current is lower than the third predetermined C-rate, for example, the C-rate of the discharging current is between 1.2C and 1.4C, it indicates that the C-rate of the discharging current is high. Then, the processing unit 130 generates an adjustment indication with a second adjustment value. In the embodiment, the second adjustment value is, for example, higher than the first adjustment value. In addition, the second adjustment value is, for example, a throttling of 75%, but the embodiment of the present invention is not limited thereto. That is, when the C-rate of the discharging current is between 1.2C and 1.4C, the processing unit 130 generates, for example, the adjustment indication with the throttling of 75% to the power receiving device, such that the power receiving device may perform the throttling of 75% for the frequency of the processing device of the power receiving device according to the adjustment indication with the throttling of 75%. Then, the processing unit 130 may continuously monitor the discharging current to perform the subsequent operation, such as the operation of generating an adjustment indication with the first adjustment value or generating an adjustment indication with the second adjustment value.

When the C-rate of the discharging current is not lower than the third predetermined C-rate, the processing unit 130 may determine whether the C-rate of the discharging current is lower than a fourth predetermined C-rate. In the embodiment, the fourth predetermined C-rate is, for example, higher than the third predetermined C-rate. In addition, the fourth predetermined C-rate is, for example, 1.5C, but the embodiment of the present invention is not limited thereto.

When the C-rate of the discharging current is lower than the fourth predetermined C-rate, for example, the C-rate of the discharging current is between 1.4C and 1.5C, it indicates that the C-rate of the discharging current is higher. Then, the processing unit 130 generates an adjustment indication with a limit indication. That is, when the C-rate of the discharging current is between 1.4C and 1.5C, the processing unit 130 generates an adjustment indication with the limit indication to the power receiving device, such that the power receiving device performs a limit operation for the frequency of the processing device of the power receiving device according to the adjustment indication with the limit indication. For example, the frequency of the processing device of the power receiving device may be limited to, for example, the throttling of 75%. Then, the processing unit 130 may continuously monitor the discharging current to perform the subsequent operation, such as the operation of generating an adjustment indication with the second adjustment value or generating an adjustment indication with the limit indication.

When the C-rate of the discharging current is not lower than the fourth predetermined C-rate, for example, the C-rate of the discharging current is higher than 1.5C, it indicates that the C-rate of the discharging current is too high. Then, the processing unit 130 generates an adjustment indication with a shutdown indication. That is, when the C-rate of the discharging current is higher than 1.5C, the processing unit 130 generates an adjustment indication with the shutdown indication to the power receiving device, such that the power receiving device may perform a shutdown operation according to the adjustment indication with the shutdown indication. Therefore, the processing unit 130 generates an adjustment indication, such that the processing device of the power receiving device performs the throttling operation or the power receiving device perform the shutdown operation to avoid the over-discharge of the battery unit 110, thereby effectively increasing lifespan, performance and safety of the battery unit 110.

Figure 2:
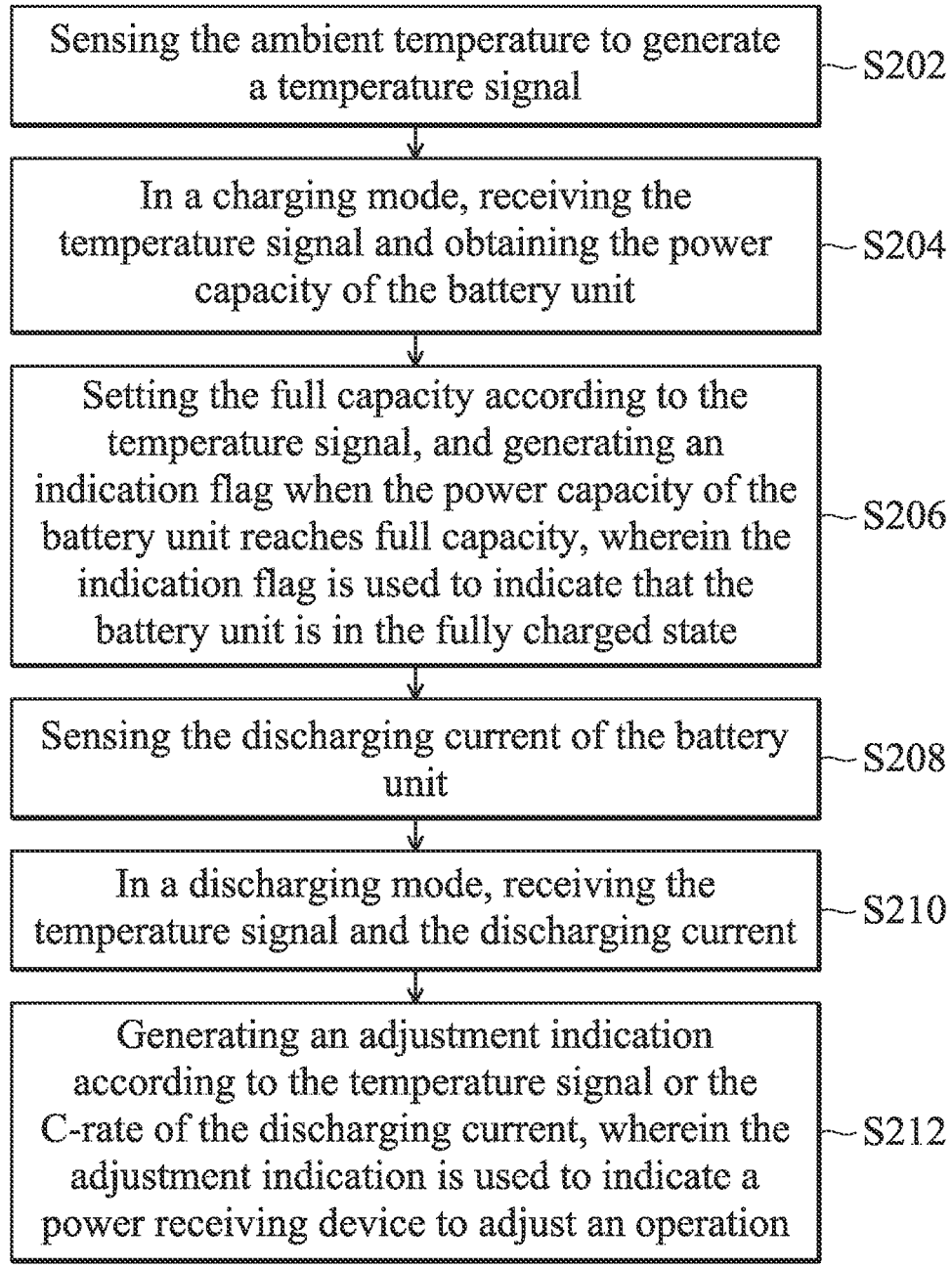
FIG. 2 is a flowchart of an operation method of a smart battery device according an embodiment of the present invention.

According to the above-mentioned description, the embodiment of the present invention additionally provides an operation method of a smart battery device. FIG. 2 is a flowchart of an operation method of a smart battery device according an embodiment of the present invention. In step S202, the method involves sensing the ambient temperature to generate a temperature signal. In step S204, the method involves in a charging mode, receiving the temperature signal and obtaining the power capacity of the battery unit. In step S206, the method involves setting the full capacity according to the temperature signal, and generating an indication flag when the power capacity of the battery unit reaches full capacity, wherein the indication flag is used to indicate that the battery unit is in the fully charged state. In step S208, the method involves sensing the discharging current of the battery unit. In step S210, the method involves in a discharging mode, receiving the temperature signal and the discharging current. In step S212, the method involves generating an adjustment indication according to the temperature signal or the C-rate of the discharging current, wherein the adjustment indication is used to indicate a power receiving device to adjust an operation.

Figure 3:
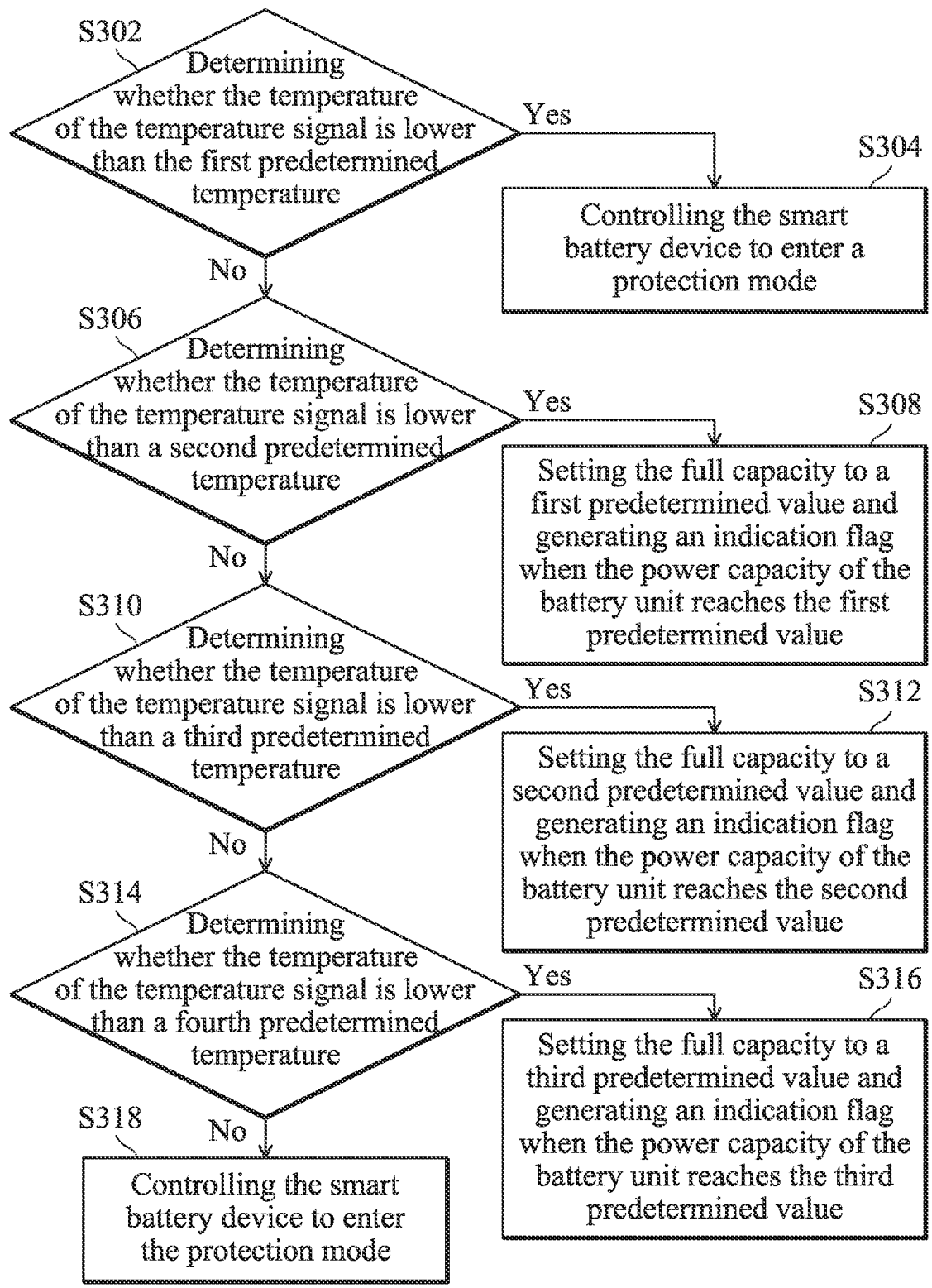
FIG. 3 is a detailed flowchart of step S206 in FIG. 2.

FIG. 3 is a detailed flowchart of step S206 in FIG. 2. In step S302, the method involves determining whether the temperature of the temperature signal is lower than the first predetermined temperature. When the temperature of the temperature signal is lower than the first predetermined temperature, the method performs step S304. In step S304, the method involves controlling the smart battery device to enter a protection mode.

When the temperature of the temperature signal is not lower than the first predetermined temperature, the method performs step S306. In step S306, the method involves determining whether the temperature of the temperature signal is lower than a second predetermined temperature. When the temperature of the temperature signal is lower than the second predetermined temperature, the method performs step S308. In step S308, the method involves setting the full capacity to a first predetermined value and generating an indication flag when the power capacity of the battery unit reaches the first predetermined value.

When the temperature of the temperature signal is not lower than the second predetermined temperature, the method performs step S310. In step S310, the method involves determining whether the temperature of the temperature signal is lower than a third predetermined temperature. When the temperature of the temperature signal is lower than the third temperature, the method performs step S312. In step S312, the method involves setting the full capacity to a second predetermined value and generating an indication flag when the power capacity of the battery unit reaches the second predetermined value. When the temperature of the temperature signal is not lower than the third predetermined temperature, the method performs step S314. In step S314, the method involves determining whether the temperature of the temperature signal is lower than a fourth predetermined temperature.

When the temperature of the temperature signal is lower than the fourth predetermined temperature, the method performs step S316. In step S316, the method involves setting the full capacity to a third predetermined value and generating an indication flag when the power capacity of the battery unit reaches the third predetermined value. When the temperature of the temperature signal is not lower than the fourth predetermined temperature, the method performs step S318. In step S318, the method involves controlling the smart battery device to enter the protection mode. In the embodiment, the second determined temperature is higher than the first predetermined temperature, the third determined temperature is higher than the second determined temperature, the fourth determined temperature is higher than the third determined temperature, the second predetermined value is lower than the first predetermined value, and the third predetermined value is lower than the second predetermined value.

Figure 4A:
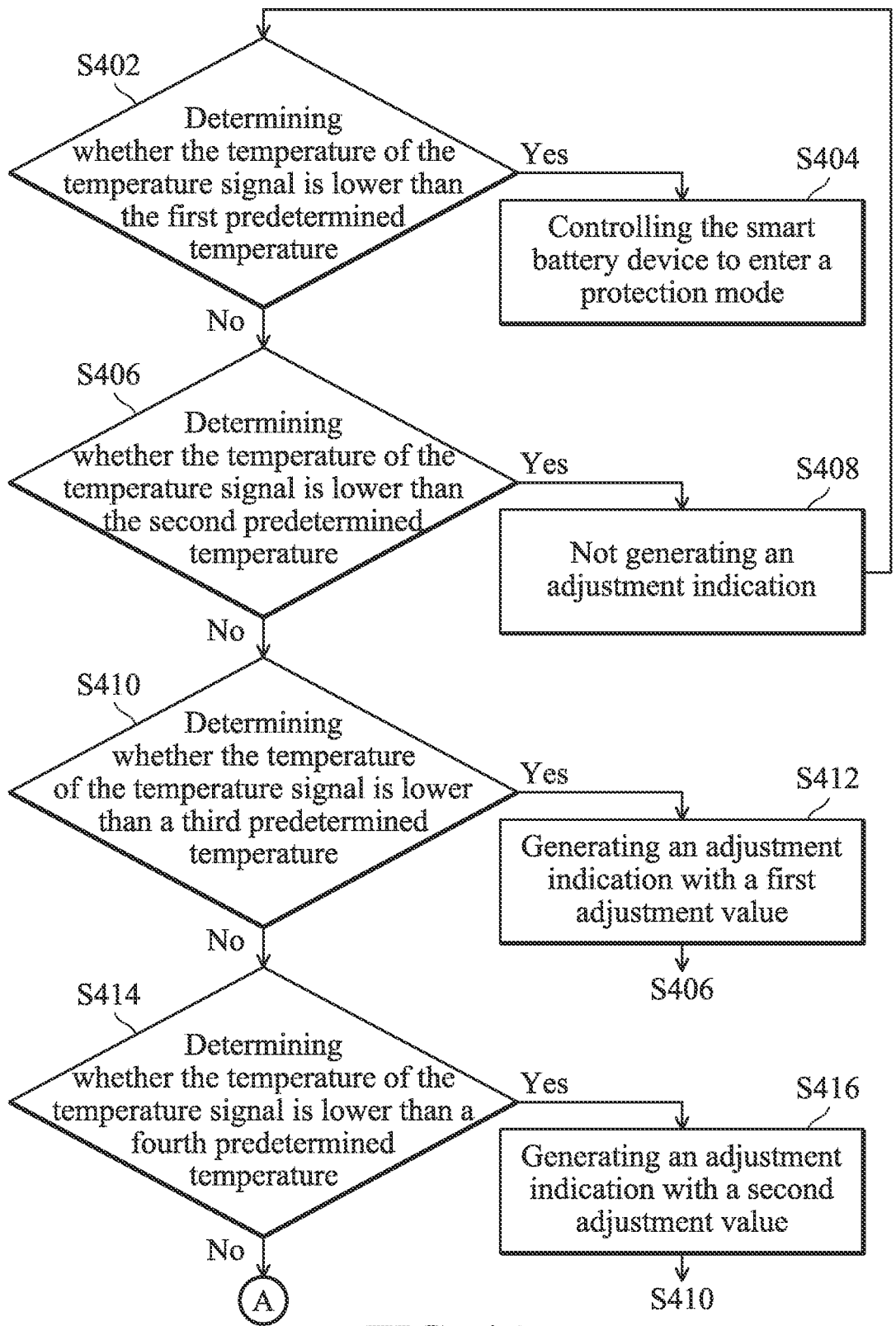
FIGS. 4A and 4B are a detailed flowchart of step S212 in FIG. 2.
Figure 4B:
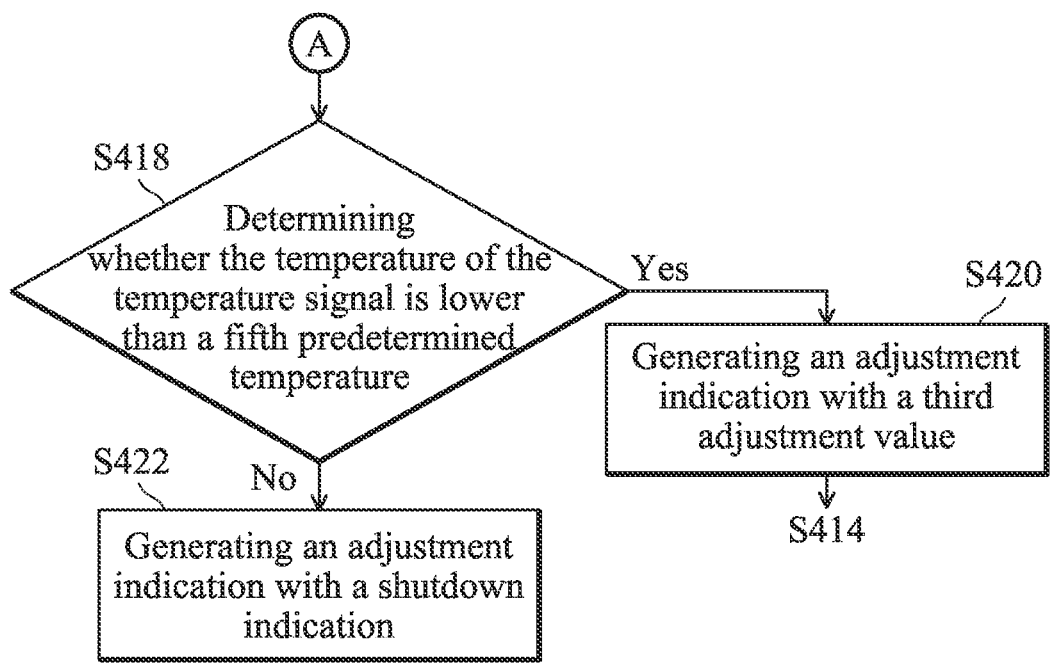

FIGS. 4A and 4B are a detailed flowchart of step S212 in FIG. 2. In step S402, the method involves determining whether the temperature of the temperature signal is lower than the first predetermined temperature. When the temperature of the temperature signal is lower than the first predetermined temperature, the method performs step S404. In step S404, the method involves controlling the smart battery device to enter a protection mode. When the temperature of the temperature signal is not lower than the first predetermined temperature, the method performs step S406. In step S406, the method involves determining whether the temperature of the temperature signal is lower than the second predetermined temperature.

When the temperature of the temperature signal is lower than the second predetermined temperature, the method performs step S408. In step S408, the method involves not generating an adjustment indication. After performing step S408, the method may return to step S402 to perform the subsequent operation.

When the temperature of the temperature signal is not lower than the second predetermined temperature, the method performs step S410. In step S410, the method involves determining whether the temperature of the temperature signal is lower than a third predetermined temperature. When the temperature of the temperature signal is lower than the third predetermined temperature, the method performs step S412. In step S412, the method involves generating an adjustment indication with a first adjustment value. After performing step S412, the method may return to step S406 to perform the subsequent operation.

When the temperature of the temperature signal is not lower than the third predetermined temperature, the method performs step S414. In step S414, the method involves determining whether the temperature of the temperature signal is lower than a fourth predetermined temperature. When the temperature of the temperature signal is lower than the fourth predetermined temperature, the method performs step S416. In step S416, the method involves generating an adjustment indication with a second adjustment value. After performing step S416, the method may return to step S410 to perform the subsequent operation.

When the temperature of the temperature signal is not lower than the fourth predetermined temperature, the method performs step S418. In step S418, the method involves determining whether the temperature of the temperature signal is lower than a fifth predetermined temperature. When the temperature of the temperature signal is lower than the fifth predetermined temperature, the method performs step S420. In step S420, the method involves generating an adjustment indication with a third adjustment value. After performing S420, the method may return to step S414 to perform the subsequent operation.

When the temperature of the temperature signal is not lower than the fifth predetermined temperature, the method performs step S422. In step S422, the method involves generating an adjustment indication with a shutdown indication. In the embodiment, the second predetermined temperature is higher than the first predetermined temperature, the third predetermined temperature is higher than the second predetermined temperature, the fourth predetermined temperature is higher than the third predetermined temperature, the fifth predetermined temperature is higher than the fourth predetermined temperature, the second adjustment value is higher than the first adjustment value, and the third adjustment value is higher than the second adjustment value.

Figure 5:
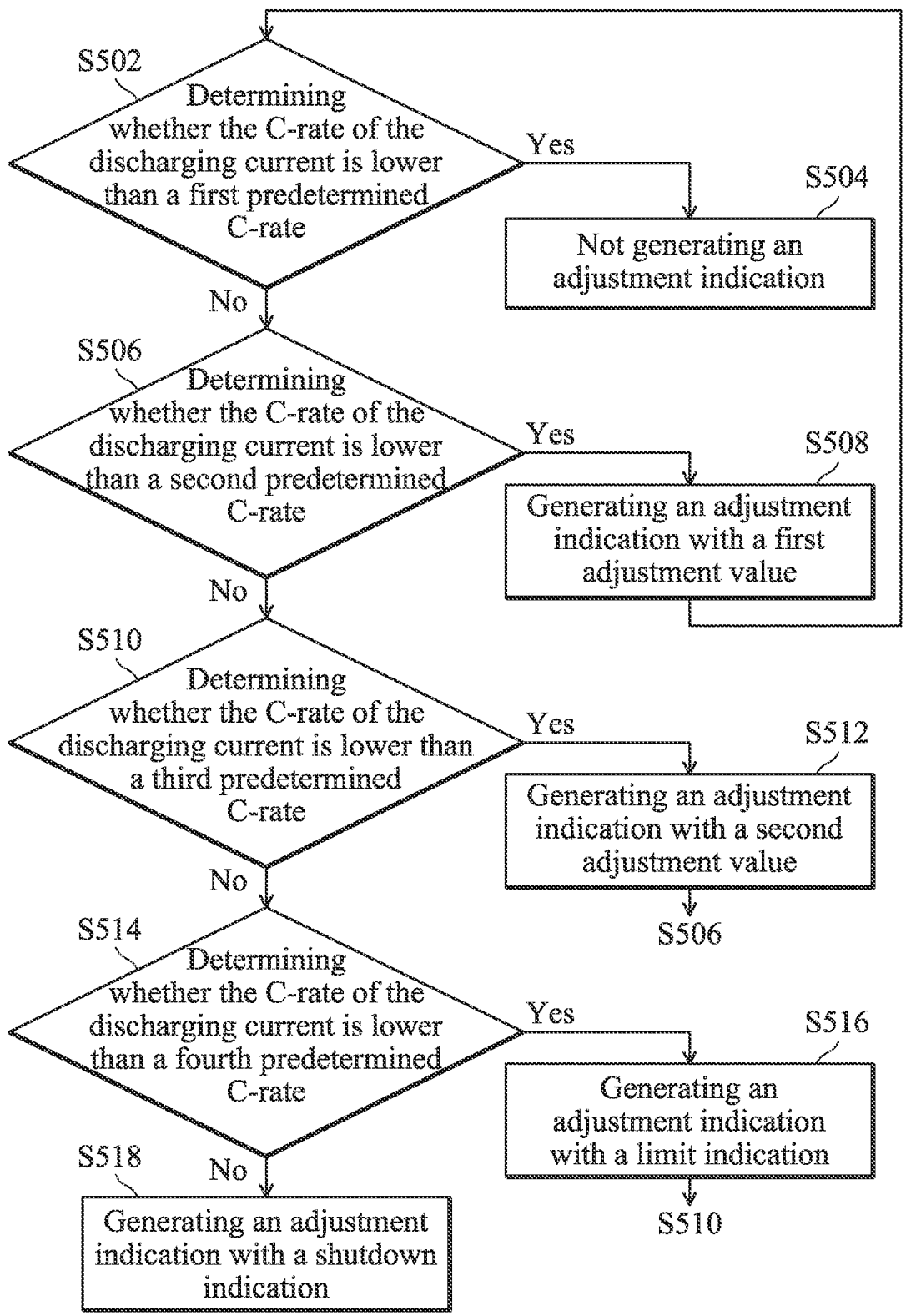
FIG. 5 is another detailed flowchart of step S212 in FIG. 2.

FIG. 5 is another detailed flowchart of step S212 in FIG. 2. In step S502, the method involves determining whether the C-rate of the discharging current is lower than a first predetermined C-rate. When the C-rate of the discharging current is lower than the first predetermined C-rate, the method performs step S504. In step S504, the method involves not generating an adjustment indication.

When the C-rate of the discharging current is not lower than the first predetermined C-rate, the method performs step S506. In step S506, the method involves determining whether the C-rate of the discharging current is lower than a second predetermined C-rate. When the C-rate of the discharging current is lower than the second predetermined C-rate, the method performs step S508. In step S508, the method involves generating an adjustment indication with a first adjustment value. After performing step S508, the method may return to step S502 to perform the subsequent operation.

When the C-rate of the discharging current is not lower than the second predetermined C-rate, the method performs step S510. In step S510, the method involves determining whether the C-rate of the discharging current is lower than a third predetermined C-rate. When the C-rate of the discharging current is lower than the third predetermined C-rate, the method performs step S512. In step S512, the method involves generating an adjustment indication with a second adjustment value. After performing step S512, the method may return to step S506 to perform the subsequent operation.

When the C-rate of the discharging current is not lower than the third predetermined C-rate, the method performs step S514. In step S514, the method involves determining whether the C-rate of the discharging current is lower than a fourth predetermined C-rate. When the C-rate of the discharging current is lower than the fourth predetermined C-rate, the method performs step S516. In step S516, the method involves generating an adjustment indication with a limit indication. After performing step S516, the method may return to step S510 to perform the subsequent operation.

When the C-rate of the discharging current is not lower than the fourth predetermined C-rate, the method performs step S518. In step S518, the method involves generating an adjustment indication with a shutdown indication. In the embodiment, the second predetermined C-rate is higher than the first predetermined C-rate, the third predetermined C-rate is higher than the second predetermined C-rate, the fourth predetermined C-rate is higher than the third predetermined C-rate, and the second adjustment value is higher than the first adjustment value.

It should be noted that the order of the steps of FIG. 2, FIG. 3, FIG. 4A, FIG. 4B and FIG. 5 is only for illustrative purposes, and is not intended to limit the order of the steps of the present invention. The user may change the order of the steps above according the requirement thereof. The flowcharts described above may add additional steps or use fewer steps without departing from the spirit and scope of the present invention.

In summary, according to the smart battery device and the operation method thereof disclosed by the embodiment of the present invention, the temperature-sensing unit senses the ambient temperature to generate the temperature signal. In the charging mode, generates an indication flag according to the temperature signal and the power capacity of the battery unit, wherein the indication flag is used to indicate that the battery unit is in the fully charged state. In addition, the embodiment of the present invention may further include the current-sensing unit to sense the discharging current of the battery unit. In the discharging mode, the processing unit generates an adjustment indication according to the temperature signal of the C-rate of the discharging current, wherein the adjustment indication is used to indicate the power receiving device to adjust the operation. Therefore, the smart battery device may be effectively managed, so as to increase lifespan, performance and safety of the battery unit.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A smart battery device, comprising:
a battery unit;
a temperature-sensing unit, configured to sense an ambient temperature to generate a temperature signal; and
a processing unit, coupled to the battery unit and the temperature-sensing unit, wherein in a charging mode, the processing unit is configured to receive the temperature signal and obtain a power capacity of the battery unit, set a full capacity according to the temperature signal, and generate an indication flag when the power capacity of the battery unit reaches the full capacity, wherein the indication flag is used to indicate that the battery unit is in a fully charged state;
wherein the processing unit further determines whether a temperature of the temperature signal is lower than a first predetermined temperature;
when the temperature of the temperature signal is lower than the first predetermined temperature, the processing unit controls the smart battery device to enter a protection mode;
when the temperature of the temperature signal is not lower than the first predetermined temperature, the processing unit determines whether the temperature of the temperature signal is lower than a second predetermined temperature;
when the temperature of the temperature signal is lower than the second predetermined temperature, the processing unit sets the full capacity to a first predetermined value and generates the indication flag when the power capacity of the battery unit reaches the first predetermined value, and the indication flag is provided to a power receiving device, such that the power receiving device displays that the battery unit is in the fully charged state;
when the temperature of the temperature signal is not lower than the second predetermined temperature, the processing unit determines whether the temperature of the temperature signal is lower than a third predetermined temperature;
when the temperature of the temperature signal is lower than the third predetermined temperature, the processing unit sets the full capacity to a second predetermined value and generates the indication flag when the power capacity of the battery unit reaches the second predetermined value, and the indication flag is provided to the power receiving device, such that the power receiving device displays that the battery unit is in the fully charged state;
when the temperature of the temperature signal is not lower than the third predetermined temperature, the processing unit determines whether the temperature of the temperature signal is lower than a fourth predetermined temperature;
when the temperature of the temperature signal is lower than the fourth predetermined temperature, the processing unit sets the full capacity to a third predetermined value and generates the indication flag when the power capacity of the battery unit reaches the third predetermined value, and the indication flag is provided to the power receiving device, such that the power receiving device displays that the battery unit is in the fully charged state; and
when the temperature of the temperature signal is not lower than the fourth predetermined temperature, the processing unit controls the smart battery device to enter the protection mode;
wherein the second predetermined temperature is higher than the first predetermined temperature, the third predetermined temperature is higher than the second predetermined temperature, the fourth predetermined temperature is higher than the third predetermined temperature, the second predetermined value is lower than the first predetermined value, and the third predetermined value is lower than the second predetermined value.

2. The smart battery device as claimed in claim 1, further comprising:
a current-sensing unit, coupled to the battery unit and the processing unit, and configured to sense a discharging current of the battery unit;
wherein in a discharging mode, the processing unit receives the temperature signal and the discharging current, and generates an adjustment indication according to the temperature signal or a C-rate of the discharging current, wherein the adjustment indication is used to indicate a power receiving device to adjust an operation.

3. The smart battery device as claimed in claim 2, wherein the processing unit further determines whether a temperature of the temperature signal is lower than a first predetermined temperature;
when the temperature of the temperature signal is lower than the first predetermined temperature, the processing unit controls the smart battery device to enter a protection mode;
when the temperature of the temperature signal is not lower than the first predetermined temperature, the processing unit determines whether the temperature of the temperature signal is lower than the second predetermined temperature;
when the temperature of the temperature signal is lower than the second predetermined temperature, the processing unit does not generate the adjustment indication;
when the temperature of the temperature signal is not lower than the second predetermined temperature, the processing unit determines whether the temperature of the temperature signal is lower than a third predetermined temperature;
when the temperature of the temperature signal is lower than the third predetermined temperature, the processing unit generates the adjustment indication with a first adjustment value;
when the temperature of the temperature signal is not lower than the third predetermined temperature, the processing unit determines whether the temperature of the temperature signal is lower than a fourth predetermined temperature;
when the temperature of the temperature signal is lower than the fourth predetermined temperature, the processing unit generates the adjustment indication with a second adjustment value;
when the temperature of the temperature signal is not lower than the fourth predetermined temperature, the processing unit determines whether the temperature of the temperature signal is lower than a fifth predetermined temperature;

when the temperature of the temperature signal is lower than the fifth predetermined temperature, the processing unit generates the adjustment indication with a third adjustment value; and when the temperature of the temperature signal is not lower than the fifth predetermined temperature, the processing unit generates the adjustment indication with a shutdown indication;

wherein the first predetermined temperature is lower than the second predetermined temperature, the second predetermined temperature is lower than the third predetermined temperature, the third predetermined temperature is lower than the fourth predetermined temperature, the fourth predetermined temperature is lower than the fifth predetermined temperature, the first adjustment value is lower than the second adjustment value, and the second adjustment value is lower than the third adjustment value.

4. The smart battery device as claimed in claim 2, wherein the processing unit further determines whether the C-rate of the discharging current is lower than a first predetermined C-rate;

when the C-rate of the discharging current is lower than the first predetermined C-rate, the processing unit does not generate the adjustment indication;

when the C-rate of the discharging current is not lower than the first predetermined C-rate, the processing unit determines whether the C-rate of the discharging current is lower than a second predetermined C-rate;

when the C-rate of the discharging current is lower than the second predetermined C-rate, the processing unit generates the adjustment indication with a first adjustment value;

when the C-rate of the discharging current is not lower than the second predetermined C-rate, the processing unit determines whether the C-rate of the discharging current is lower than a third predetermined C-rate;

when the C-rate of the discharging current is lower than the third predetermined C-rate, the processing unit generates the adjustment indication with a second adjustment value;

when the C-rate of the discharging current is not lower than the third predetermined C-rate, the processing unit determines whether the C-rate of the discharging current is lower than a fourth predetermined C-rate;

when the C-rate of the discharging current is lower than the fourth predetermined C-rate, the processing unit generates the adjustment indication with a limit indication; and when the C-rate of the discharging current is not lower than the fourth predetermined C-rate, the processing unit generates the adjustment indication with a shutdown indication;

wherein the first predetermined C-rate is lower than the second predetermined C-rate, the second predetermined C-rate is lower than the third predetermined C-rate, the third predetermined C-rate is lower than the fourth predetermined C-rate, and the first adjustment value is lower than the second adjustment value.

5. An operation method of a smart battery device, comprising:

sensing an ambient temperature to generate a temperature signal;

in a charging mode, receiving the temperature signal and obtaining a power capacity of a battery unit; and setting a full capacity according to the temperature signal, and generating an indication flag when the power capacity of the battery unit reaches the full capacity, wherein the indication flag is used to indicate that the battery unit is in a fully charged state;

wherein the step of setting the full capacity according to the temperature signal, and generating the indication flag when the power capacity of the battery unit reaches the full capacity comprises:

determining whether a temperature of the temperature signal is lower than a first predetermined temperature;

when the temperature of the temperature signal is lower than the first predetermined temperature, controlling the smart battery device to enter a protection mode;

when the temperature of the temperature signal is not lower than the first predetermined temperature, determining whether the temperature of the temperature signal is lower than a second predetermined temperature;

when the temperature of the temperature signal is lower than the second predetermined temperature, setting the full capacity to a first predetermined value and generating the indication flag when the power capacity of the battery unit reaches the first predetermined value, wherein the indication flag is provided to a power receiving device, such that the power receiving device displays that the battery unit is in the fully charged state;

when the temperature of the temperature signal is not lower than the second predetermined temperature, determining whether the temperature of the temperature signal is lower than a third predetermined temperature;

when the temperature of the temperature signal is lower than the third predetermined temperature, setting the full capacity to a second predetermined value and generating the indication flag when the power capacity of the battery unit reaches the second predetermined value, wherein the indication flag is provided to the power receiving device, such that the power receiving device displays that the battery unit is in the fully charged state;

when the temperature of the temperature signal is not lower than the third predetermined temperature, determining whether the temperature of the temperature signal is lower than a fourth predetermined temperature;

when the temperature of the temperature signal is lower than the fourth predetermined temperature, setting the full capacity to a third predetermined value and generating the indication flag when the power capacity of the battery unit reaches the third predetermined value, wherein the indication flag is provided to the power receiving device, such that the power receiving device displays that the battery unit is in the fully charged state; and when the temperature of the temperature signal is not lower than the fourth predetermined temperature, controlling the smart battery device to enter the protection mode;

wherein the second predetermined temperature is higher than the first predetermined temperature, the third predetermined temperature is higher than the second predetermined temperature, the fourth predetermined temperature is higher than the third predetermined temperature, the second predetermined value is lower than the first predetermined value, and the third predetermined value is lower than the second predetermined value.

6. The operation method of the smart battery device as claimed in claim 5, further comprising:
sensing a discharging current of the battery unit;
in a discharging mode, receiving the temperature signal and the discharging current; and
generating an adjustment indication according to the temperature signal or a C-rate of the discharging current, wherein the adjustment indication is used to indicate a power receiving device to adjust an operation.

7. The operation method of the smart battery device as claimed in claim 6, wherein the step of generating the adjustment indication according to the temperature signal comprises:
determining whether a temperature of the temperature signal is lower than a first predetermined temperature;
when the temperature of the temperature signal is lower than the first predetermined temperature, controlling the smart battery device to enter a protection mode;
when the temperature of the temperature signal is not lower than the first predetermined temperature, determining whether the temperature of the temperature signal is lower than a second predetermined temperature;
when the temperature of the temperature signal is lower than the second predetermined temperature, not generating the adjustment indication;
when the temperature of the temperature signal is not lower than the second predetermined temperature, determining whether the temperature of the temperature signal is lower than a third predetermined temperature;
when the temperature of the temperature signal is lower than the third predetermined temperature, generating the adjustment indication with a first adjustment value;
when the temperature of the temperature signal is not lower than the third predetermined temperature, determining whether the temperature of the temperature signal is lower than a fourth predetermined temperature;
when the temperature of the temperature signal is lower than the fourth predetermined temperature, generating the adjustment indication with a second adjustment value;
when the temperature of the temperature signal is not lower than the fourth predetermined temperature, determining whether the temperature of the temperature signal is lower than a fifth predetermined temperature;
when the temperature of the temperature signal is lower than the fifth predetermined temperature, generating the adjustment indication with a third adjustment value; and
when the temperature of the temperature signal is not lower than the fifth predetermined temperature, generating the adjustment indication with a shutdown indication;
wherein the second predetermined temperature is higher than the first predetermined temperature, the third predetermined temperature is higher than the second predetermined temperature, the fourth predetermined temperature is higher than the third predetermined temperature, the fifth predetermined temperature is higher than the fourth predetermined temperature, the second adjustment value is higher than the first adjustment value, and the third adjustment value is higher than the second adjustment value.

8. The operation method of the smart battery device as claimed in claim 6, wherein the step of generating the adjustment indication according to the C-rate of the discharging current comprises:
determining whether the C-rate of the discharging current is lower than a first predetermined C-rate;
when the C-rate of the discharging current is lower than the first predetermined C-rate, not generating the adjustment indication;
when the C-rate of the discharging current is not lower than the first predetermined C-rate, determining whether the C-rate of the discharging current is lower than a second predetermined C-rate;
when the C-rate of the discharging current is lower than the second predetermined C-rate, generating the adjustment indication with a first adjustment value;
when the C-rate of the discharging current is not lower than the second predetermined C-rate, determining whether the C-rate of the discharging current is lower than a third predetermined C-rate;
when the C-rate of the discharging current is lower than the third predetermined C-rate, generating the adjustment indication with a second adjustment value;
when the C-rate of the discharging current is not lower than the third predetermined C-rate, determining whether the C-rate of the discharging current is lower than a fourth predetermined C-rate;
when the C-rate of the discharging current is lower than the fourth predetermined C-rate, generating the adjustment indication with a limit indication; and
when the C-rate of the discharging current is not lower than the fourth predetermined C-rate, generating the adjustment indication with a shutdown indication;
wherein the second predetermined C-rate is higher than the first predetermined C-rate, the third predetermined C-rate is higher than the second predetermined C-rate, the fourth predetermined C-rate is higher than the third predetermined C-rate, and the second adjustment value is higher than the first adjustment value.

* * * * *